United States Patent
So et al.

(10) Patent No.: US 8,897,295 B2
(45) Date of Patent: Nov. 25, 2014

(54) METHOD AND SYSTEM FOR PROVIDING TRAFFIC ENGINEERING INTERWORKING

(75) Inventors: Ning So, Plano, TX (US); Sherman Huang, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 518 days.

(21) Appl. No.: 12/122,035

(22) Filed: May 16, 2008

(65) Prior Publication Data

US 2009/0285097 A1   Nov. 19, 2009

(51) Int. Cl.
*H04L 12/891*   (2013.01)
*H04Q 11/00*   (2006.01)
*H04L 12/24*   (2006.01)

(52) U.S. Cl.
CPC ........ *H04Q 11/0062* (2013.01); *H04L 41/0896* (2013.01); *H04L 47/41* (2013.01); *H04Q 2011/0077* (2013.01)
USPC .......................................... 370/389; 370/252

(58) Field of Classification Search
CPC .... H04L 41/0896; H04L 47/41; H04L 47/825
See application file for complete search history.

(56) References Cited

U.S. PATENT DOCUMENTS

| | | | |
|---|---|---|---|
| 6,377,554 B1 * | 4/2002 | Farnsworth et al. | 370/252 |
| 6,665,273 B1 * | 12/2003 | Goguen et al. | 370/252 |
| 2008/0279103 A1 * | 11/2008 | Yong et al. | 370/235 |

* cited by examiner

*Primary Examiner* — Benjamin Lamont

(57) ABSTRACT

An approach is provided for interworking traffic onto a composite transport group (CTG). An attribute associated with a composite transport group is determined based on a characteristic of a traffic flow associated with a label-switched network. The traffic flow is mapped to one or more component connections of the composite transport group based on the attribute.

20 Claims, 8 Drawing Sheets

METHOD AND SYSTEM FOR PROVIDING TRAFFIC ENGINEERING INTERWORKING

BACKGROUND INFORMATION

Telecommunication networks have developed from connection-oriented, circuit-switched (CO-CS) systems, such as the public switched telephone network (PSTN), utilizing constant bit-rate, predefined point-to-point connections to connectionless, packet-switched (CNLS) systems, such as the Internet, utilizing dynamically configured routes characterized by one or more communication channels divided into arbitrary numbers of variable bit-rate channels. With the increase in demand for broadband communications and services, telecommunication service providers are beginning to integrate long-distance, large-capacity optical communication networks with these traditional CO-CS and CNLS systems. Typically, these optical communication networks utilize multiplexing transport techniques, such as time-division multiplexing (TDM), wavelength-division multiplexing (WDM), and the like, for transmitting information over optical fibers. However, an increase in demand for more flexible, resilient transport is driving optical communication networks toward high-speed, large-capacity packet-switching transmission techniques that enable switching and transport functions to occur in completely optical states via one or more packets. This technological innovation carries with it a new burden to provision reliable service over these networks, i.e., service that is capable of withstanding link and node failure while also maintaining high transmission capacity. As a result, traffic engineering plays an important role in providing high network reliability and performance. However, given that a multitude of networks operate using various infrastructures and protocols, there is a continual challenge for telecommunication service providers to traffic interoperate transparently across these systems.

Therefore, there is a need for an approach that provides for effective and efficient interworking of traffic across multiple networks.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for interworking traffic onto composite transport groups are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although the various exemplary embodiments are described with respect interworking between composite transport groups (CTG) and multi-protocol label switching (MPLS) traffic flows, it is contemplated that the various exemplary embodiments are also applicable to other equivalent technologies and traffic flows.

Figure 1:
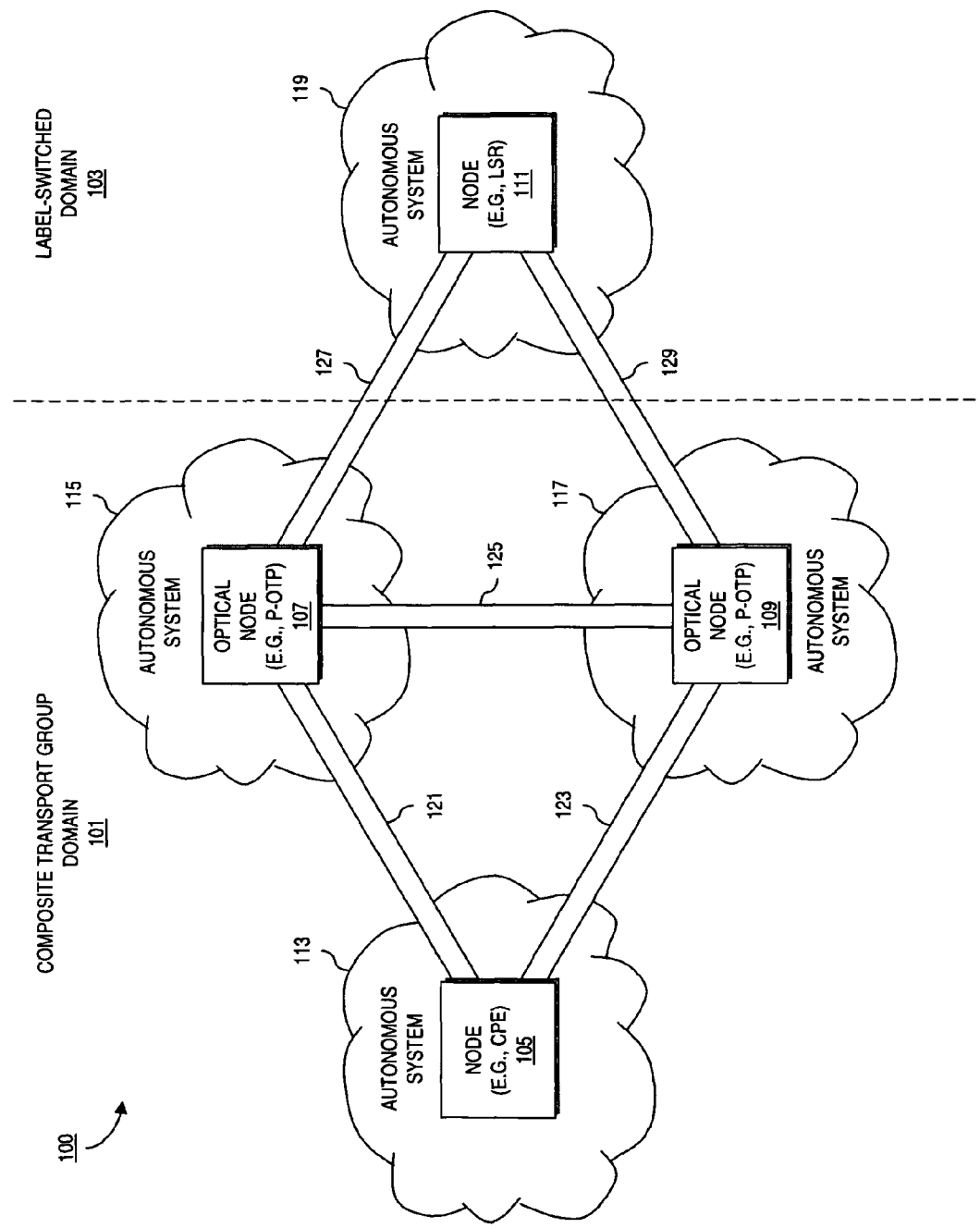
FIG. 1 is a diagram of a system configured for providing traffic engineering interworking using composite transport groups, according to an exemplary embodiment.

FIG. 1 is a diagram of a system configured for providing traffic engineering interworking using composite transport groups, according to an exemplary embodiment. For the purposes of illustration, a system 100 for interworking traffic is described with respect to interworking between composite transport groups (CTG) and multi-protocol label switching (MPLS) traffic flows within a packet-switched optical infrastructure. As shown, system 100 includes a CTG domain 101 and a label-switched domain 103, such as an MPLS domain. In one particular implementation, CTGs are established within CTG domain 101 between client nodes (e.g., node 105) and one or more optical nodes (e.g., optical nodes 107 and 109). Further, MPLS traffic flows may be established (or terminated) at one or more boundary nodes (e.g., node 111) of label-switched domain 103. As such, MPLS traffic flows can be interworked between CTG domain 101 and label-switched domain 103 so as to enable the traffic flows to traverse between autonomous systems (AS) 113, 115, 117, and/or 119.

According to particular embodiments, the packet-switched optical infrastructure of system 100 may be provisioned by disparate service providers. For example, AS 113 may be provisioned by a first service provider, e.g., service provider "A," while AS 115, 117, and 119 may be provisioned by a second service provider, e.g., service provider "B." In this manner, optical links 121 and 123 may be considered "off-network" links, i.e., transport channels extending between AS 113 of service provider "A" and AS 115 and 117 of service provider "B." Meanwhile, optical links 125, 127, and 129 may be considered "on-network" links, i.e., transport channels extending between AS 115, 117, and/or 119 of service provider "B." It is noted that in an alternative embodiment, AS 115, 117, and 119 can be sub-networks of a single AS. In certain other embodiments, client (subscriber or customer) node 105 is customer premise equipment (CPE) with optical nodes 107 and 109, and boundary node 111 under control of a service provider, which in this instance is service provider "B." Additionally, it is contemplated that node 105 can be owned by service provider "B." While specific reference will be made to the aforementioned scenario, it is contemplated that system 100 may embody many forms and include multiple and/or alternative components and facilities.

It is recognized that multi-protocol label switching (MPLS) traffic engineering (TE) has been developed to provide network administrators with the ability to control and manipulate the flow of traffic through a network. MPLS-TE utilizes label switching techniques to construct label switched paths (LSP), label distribution protocol (LDP) flows, and fast re-route (FRR) tunnels on one or more links interconnecting nodes of one or more networks. Routing protocols, such as open-shortest path first (OSPF) and intermediate system to intermediate system (IS-IS), are utilized to determine MPLS traffic flow routes through the network, as well as govern the distribution of routing information between nodes of the network(s). OSPF and IS-IS utilize various attributes characterizing the links, such as bandwidth, priority, and the like, to determine MPLS traffic flow routes and, thereby, require nodes of the network to report (or announce) these characteristics concerning any directly connected links. It is noted that these attributes (or characteristics) may also be referred to as TE parameters. As the topology of transport networks become more and more complex, the announcement and utilization of TE parameters becomes increasingly onerous and inefficient.

Therefore, the approach, according to certain embodiments, stems from the recognition that provisioning CTGs in support of MPLS-TE logically reduces the complexity of network topology, as well as the amount of TE parameters that must be announced. In turn, MPLS-TE is enhanced and routing scalability is improved. This is because CTGs manage sets of "component connections" (i.e., logical channels) as "composite connections," as well as manage associations between client node instances and composite connections, which enable CTGs to dynamically distribute network traffic over the component connections transparently from the nodes transmitting and receiving a flow of traffic. In other words, CTGs, among other features, enable individual pathways to carry network traffic from multiple client nodes, maintain independent pathway transport availabilities and capacities, and provide for disparate transport rates, all the while enabling these individual pathways to provide pathway protection for one another. Furthermore, provisioning CTGs in support of MPLS-TE only requires the CTGs to be announced as single TE pathways that are characterized by aggregate TE parameters, instead of having to individually report a multitude of component connections and their mass of associated TE parameters. Namely, when an MPLS traffic flow is established, only the aggregate CTG pathway need be identified, such that provisioning the MPLS traffic flow over the CTG becomes a local matter transparently resolved by the CTG, as opposed to the nodes transmitting and receiving the flow of traffic. This transparency is realized by interworking between CTGs and MPLS traffic flows at border nodes between CTG domains and MPLS domains.

According to one embodiment, system 100 providing interworking by mapping traffic flows onto CTGs based on characteristics of the traffic flow to attributes of the component connections of the CTG. The CTG can be established between client node 105, such as a client device, router, switch, or any other suitable CPE (or provider edge (PE)), and two or more optical nodes (e.g., optical nodes), 107 and 109), such as a reconfigurable optical add/drop multiplexor (ROADM), or other suitable optical transport platform (e.g., packet optical transport platform (P-OTP)). The traffic flow may originate from (or terminate at) one or more boundary nodes (e.g., node 111), such as a label switched router (LSR), or other suitable traffic routing entity of label-switched domain 103. Namely, an MPLS traffic flow may be interworked onto one or more component connections of a CTG by determining one or more attributes associated with the CTG, i.e., one or more attributes of the one or more component connections of the CTG, based on one or more characteristics of the MPLS traffic flow. These attributes may then be utilized to map the MPLS traffic flow onto the CTG, i.e., onto one or more of the component connections of the CTG. In certain instances, mapping relationships between traffic flows and component connections of a CTG may be one-to-one, one-to-many, many-to-one, or many-to-many. Further, mapping relationships may be established on a per flow basis, a per traffic flow packet basis, or a per traffic flow label basis. According to other embodiments, various component connection attributes, e.g., bandwidth and/or priority, may be automatically configured and mapped even though a specific traffic flow bandwidth and/or priority is not specified.

In exemplary embodiments, CTG domain 101 includes two CTGs. One CTG (or composite connection) may be established for transport of network traffic from optical node 107 to client node 105, and may include a first set (or bundle) of logical channels (or component connections), while another CTG may be established for transport of network traffic from optical node 109 to client node 105, and may include a second set of logical channels. The first set of logical channels may include a logical channel defined by optical link 121 (e.g., a primary channel) and a logical channel defined by the conjunction of optical links 123 and 125 (e.g., a secondary channel). The second set of logical channels may include a logical channel defined by optical link 123 (e.g., a primary channel) and a logical channel defined by the conjunction of optical links 121 and 125 (e.g., a secondary channel). It is contemplated, however, that logical channels may also be grouped in multiple CTGs. Furthermore, the CTGs of CTG domain 101 may be configured to support connection-oriented flows, e.g., network traffic embodying, for example, information packetized into one or more packets. Connectionless communications may also be encapsulated within connection-oriented connections. As such, traffic flows traversing optical links 127 and/or 129 may be interworked onto these CTGs by determining an attribute associated with one or more of optical links 121, 123, and 125 based on a characteristic of the traffic flows. Exemplary characteristics may include traffic flow bandwidth, traffic flow priority, etc. In turn, attributes associated with a CTG, i.e., one or more component connections of the CTG, may correspond to component connection bandwidths (e.g., physical, available, consumed) and component connection priorities (e.g., connection placement priorities, connection holding priorities).

According to exemplary embodiments, the traffic flows can include MPLS pathways, such as an LSP, an LDP flow, or a FRR tunnel. These MPLS pathways can be transparently routed over one or more of the component connections of the CTG, i.e., routed independently from a transmitting node (e.g., node 111) and a receiving node (e.g., node 105) of the pathway. In this manner, system 100 permits nodes 105 and 111 to treat CTGs as physical trunks, whereas the CTGs handle the routing of traffic on its own. This preserves the configurations at nodes 105 and 111, as well as at optical nodes 107 and 109. Thus, the use of CTGs can, for instance, can save up to 50% access cost compared to traditional systems. Additionally, CTGs can also save up to 50% on port costs. Further, provisioning can be simplified at nodes 105 and 111 and MPLS-TE can be more easily and efficiently applied.

As seen in FIG. 1, system 100 includes AS (or networks) 113, 115, 117, and 119 that, in turn, include nodes 105, 107, 109, and 111, respectively. In exemplary embodiments, system 100 is a connection-oriented transport environment having one or more optical links (e.g., optical links 121, 123, 125, 127, and 129) established therein, wherein individual optical links embody optical fibers configured to carry data between two nodes, e.g., between nodes 105 and 107. It is noted that optical links 121, 123, 125, 127, and 129 may be automatically setup and torn down by means of any suitable signaling protocol, e.g., label distribution protocol (LDP), constraint-based routing over label distribution protocol (CD-LDP), targeted LDP (TLDP), resource reservation protocol for traffic engineering (RSVP-TE), etc. Accordingly, optical links 121, 123, 125, 127, and 129 may carry information over various wavelengths or "channels." Routing protocols may include OSPF, IS-IS, border gateway protocol (BGP), interior gateway protocol (IGP), or any other suitable link-state or optimized link-state routing protocol.

AS 113, 115, 117, and 119 may be any type of wired and/or wireless transport network, such as a local area network (LAN), metropolitan area network (MAN), wide area network (WAN), etc. At least a portion of AS 113, 115, and 117 comply with the International Telecommunications Union-Telecommunication (ITU-T) standards recommendation working draft G.800 titled, "Unified Functional Architecture of Transport Networks," which is incorporated herein, by reference, in its entirety. Meanwhile, at least a portion of AS 119 complies with the International Telecommunications Union-Telecommunication (ITU-T) standards recommendation working draft G.8110 titled, "MPLS Layer Network Architecture," which is incorporated herein, by reference in its entirety. Further, AS 113, 115, 117, and 119 can be configured for traffic engineering, such as MPLS-TE.

Client node 105 may be any type of customer premise equipment, such as a computing device, router, switch, etc., while optical nodes 107 and 109 may be any suitable optical transport platform, such as a terminal multiplexor, a reconfigurable add/drop multiplexer, photonic switch, optical cross-connect with optical-electrical-optical conversion, synchronous optical networking cross-connect, signal regenerator, router, switch, or any other suitable optical networking interface, such as a packet optical transport platform. Node 111 may be an LSR, such as a boundary, edge, or gateway node.

Accordingly, information transport can occur between nodes 105, 107, 109, and 111 of AS 113, 115, 117, and 119 via optical links 121, 123, 125, 127, and 129, which represent channels (or paths) along which packets may be transported. As such, a topology of system 100 can be characterized via optical links 121, 123, 125, 127, and 129, which further characterize the available transport capacity (e.g., bandwidth capacity) between nodes 105, 107, 109, and 111 of AS 113, 115, 117, and 119. Thus, during optical link configuration, optical links 121, 123, and 125 may be established and grouped into one or more CTGs for provisioning network traffic among and between nodes 105, 107, and 109 within CTG domain 101. Moreover, during optical link configuration, optical links 127 and 129 may be established and utilized for transport of traffic flows, e.g., MPLS traffic flows, between nodes 105 and 111. Consequently, CTGs give nodes 105, 107, and 109 the property of adjacency when viewed by higher layer networking protocols, such as OSPF, IS-IS, etc. For example, node 111 will only perceive a single logical connection between optical node 107 and node 105 for provisioning traffic between label-switched domain 103 and CTG domain 101. However, at least in exemplary embodiments, two component connections between optical node 107 and node 105 exist for hosting the traffic provisioned on the CTG established between optical node 107 and 105.

Figure 2:
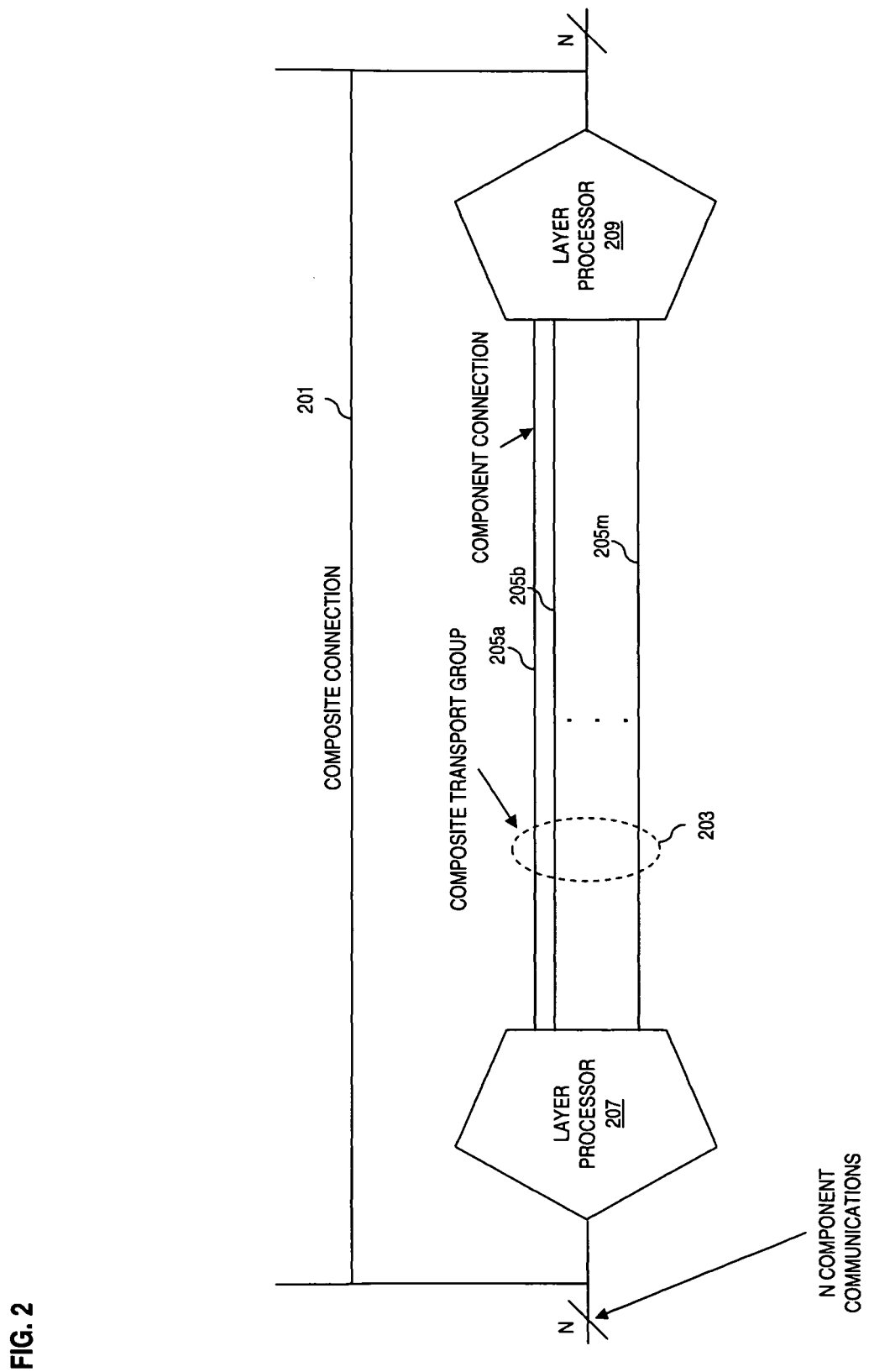
FIG. 2 is a diagram of a composite transport group, according to an exemplary embodiment.

FIG. 2 is a diagram of a composite transport group, according to an exemplary embodiment. As shown, composite connection 201 is made available via CTG 203, which includes one or more parallel component connections (e.g., physical and/or logical links), e.g., component connections 205a-205m, sharing similar ingress and egress points. According to one embodiment, CTG 203 ingress and egress points correspond to nodes 105, 107, and/or 109. For instance, node 105 may be an egress point of two CTGs, while nodes 107 and 109 may be respective ingress points of the two CTGs. Additionally, nodes 107 and 109 may embody "net hop" nodes on a path of the CTGs, i.e., on a path of a component connection of a CTG. Further, CTGs established among nodes 105, 107, and 109 may serve as "next hop" paths for traffic engineered flows, e.g., MPLS traffic flows, originating from an "upstream" source, e.g., node 111, which may also serve as a terminating "downstream" target, in alternative embodiments.

From the perspective of CTG 203, each component connection 205a-205m acts as an independent transportation entity, and therefore, enables independent transportation path availabilities (e.g., physical and/or available bandwidths) for composite connection 201, i.e., for network traffic. That is, if network traffic is sequenced at an ingress point and transported over one or more component connections (e.g., component connections 205a-205m), then the network traffic may or may not arrive at an egress point in the same sequential order. Thus, when information is transported via composite connection 201 utilizing CTG 203, a layer processor (LP) at the ingress (e.g., LP 207) distinguishes component connections 205a-205m by processing each packet and distributing the packets over composite connection 201 via one or more of component connections 205a-205m. The ability of LP 207 to distinguish between component connections 205a-205m is dependent upon packet header format and information encoded therein, such as one or more labels for label-switch routing and/or one or more characteristics of a label-switched traffic flow that can be mapped to one or more attributes of component connections 205a-205m. Thus, LP 207 routes network traffic transparently from the entities attempting to transport and receive the traffic. In this manner, a network gains transport scalability via composite connection 201 because individual component connections can be independently added, removed, and/or resolved by CTG 203, and since the transportation entities are only privy to the fact that composite connection 201, as a whole, is operational, the configuration of the transportation entities need not be affected.

Thus, composite connection 201 made available via CTG 203 can be applied in both connection-less packet-switched (CL-PS) optical networks, as well as in connection-oriented packet-switched (CO-PS) optical networks. In CL-PS environments, component connections 205a-205m can exist as point-to-point links between autonomous systems (e.g., autonomous systems 115 and 117). Optical nodes 107 and 109 utilize information encoded in packet headers provided by, for example, client nodes (e.g., node 105) and/or boundary nodes (e.g., node 111) to distinguish between client communications. That is, a processing entity (or control interface) of optical nodes 107 and 109 utilize this information to differentiate between component connections (e.g., component connections 205a-205m) and distribute network traffic over one or more CTGs (e.g., CTG 203). Thus, network traffic transported via CTG 203 is "seen" by client nodes (e.g., node 105) or boundary nodes (e.g., node 111) as "belonging" to composite connection 201, as opposed to the particular component connection 205a-205m "actually" supporting the flow of network traffic.

In CO-PS environments, component connections 205a-205m of CTG 203 can be configured as point-to-point links, as above, or as point-to-point paths. Paths may be established over one or more optical links (e.g., optical links 121, 123, and/or 125) and, thereby, traverse one or more nodes (e.g., nodes 105, 107, and/or 109). For composite connection 201 to support multiple communications from client nodes (e.g., node 105) or boundary nodes (e.g., node 111) information may be encoded within individual packet headers to differentiate between communications, as well as describe the communications, such as via a bandwidth or priority description. Accordingly, at composite connection 201 ingress, LP 207 can use this information to distribute packets over component connections 205a-205m, which enables multiple composite connections 201 to be configured over a CTG, such as CTG 203. Further, LP 207 may, when determining which component connection to utilize to support transport, use this information to perform traffic engineering and routing processes, e.g., to assign resource capacity or priority for individual communications. Namely, LP 207 may interwork traffic flows onto one or more component connections 205a-205m of CTG 203 utilizing this information, i.e., utilizing the characteristics of the traffic flows. In particular embodiments, this information may be acquired from a network administrator or network management system (not shown), as opposed to the packet headers. Thus, a composite connection 201 may be traffic engineered per component connections 205a-205m, as well as traffic engineered based on component connection attributes, e.g., bandwidth capability, priority setting, operational status, and the like, or node 105 attributes, e.g., allocated capacity, priority, origination address, destination address, etc., which may be determined based on characteristics of an traffic flow.

Figure 3:
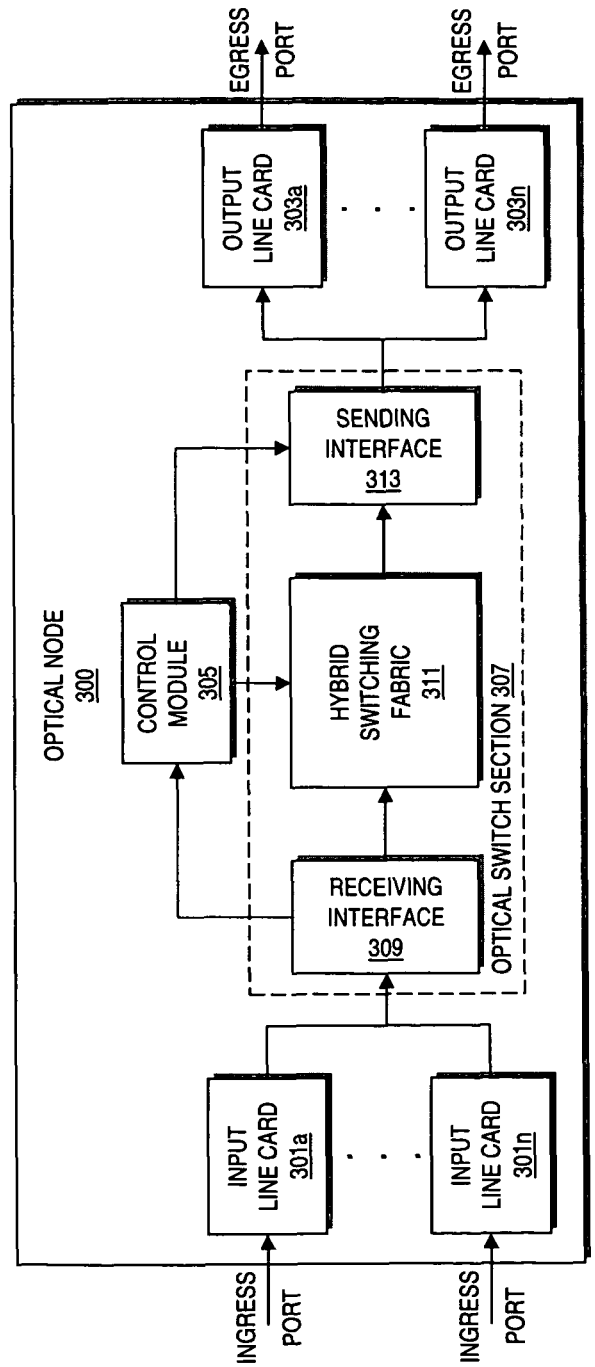
FIG. 3 is a diagram of an optical node configured to map traffic onto composite transport groups, according to an exemplary embodiment.

FIG. 3 is a diagram of an optical node configured to map traffic onto composite transport groups, according to an exemplary embodiment. For explanatory purposes, optical node 300 is described with respect to optical packet switching; however, may include functionality for optical burst switching, time division multiplexing (TDM), wavelength-division multiplexing (WDM), or any other suitable signal transfer scheme. As shown, optical node 300 includes input line cards 301a-301n, output line cards 303a-303n, control interface 305, and optical switch section 307; however, it is contemplated that optical node 300 may embody many forms. For example, optical node 300 may comprise computing hardware (such as described with respect to FIG. 8), as well as include one or more components configured to execute the processes described herein for establishing CTGs and interworking traffic onto those CTGs. Furthermore, it is contemplated that the components of optical node 300 may be combined, located in separate structures, or separate physical locations. In other words, a specific topology is not critical to embodiments of optical node 300 or system 100.

According to one embodiment, input line cards 301a-301n act as "n" input interfaces (ingress points) to optical node 300 from "n" transmitting sources (e.g., node 105), while output line cards 303a-303n act as "n" output interfaces (egress points) from optical node 300 to "n" destination nodes (e.g., optical nodes 107 and 109). When packets arrive at optical node 300, input line cards 301a-301n port packets to receiving interface 309 of optical switch section 307. Receiving interface 309 separates headers and payloads from individual packets. Header information is provided to control interface 305 for routing purposes, while payloads are switched to destination output line cards 303a-303b via hybrid switching fabric 311 and sending interface 313. That is, hybrid switching fabric 311 routes payloads to appropriate pathways on sending interface 313, whereby updated headers are combined with switched payloads. The combination is output to destination nodes via output line cards 303a-303n.

Figure 4:
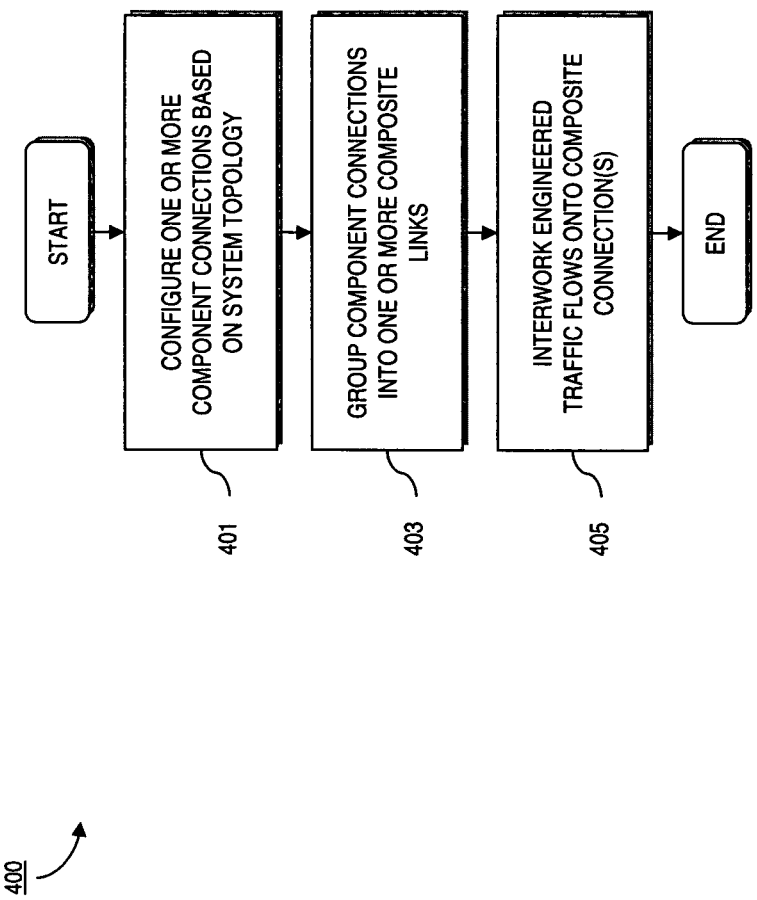
FIG. 4 is a flowchart of a process for establishing a composite transport group to host traffic flows from a label-switched domain, according to an exemplary embodiment.

In particular implementations, control interface 305 is configured to provision one or more logical channels through hybrid switching fabric 311 based on system 100 topological information. These logical channels can be grouped into one or more CTGs. In turn, these CTGs may be interworked to host traffic flows from, for example, label-switched domain 103. FIG. 4 is a flowchart of a process for establishing a composite transport group to host traffic flows from a label-switched domain, according to an exemplary embodiment. For illustrative purposes, process 400 is described with reference to FIGS. 1 and 2. It is noted that process 400 assumes the existence of one or more previously established (or constructed) physical connections (e.g., optical links 121, 123, and/or 125) configured to transport network traffic, such as user information or network control information. The steps of process 400 may be performed in any suitable order or combined in any suitable manner.

At step 401, one or more optical nodes (e.g., optical nodes 107 and 109) configure one or more component connections (i.e., logical channels) based on a topology of system 100, i.e., based on the establishment of one or more physical connections (e.g., optical links 121, 123, and 125). Individual component connections may be configured over an optical link (e.g., optical link 121) or over a group of optical links (i.e., a path), such as a path defined by optical links 123 and 125. In this manner, component connections are independent channels configured for transporting information, wherein each component connection is individually characterized by its own transport availability, i.e., existence, physical bandwidth, available bandwidth, consumed bandwidth, operational status, priority, and the like. Thus, in step 403, various component connections may be grouped into one or more CTGs, such that any given CTG (e.g., CTG 203) includes several parallel component connections (e.g., component connections 205a-205m) establishing a transport route from a desired point "A," e.g., optical node 107, to a desired point "B," e.g., client node 105. For example, CTG domain 101 may be characterized by two CTGs, e.g., one CTG may embody optical link 121 (i.e., a physical component connection) and the conjunction of optical links 123 and 125 (i.e., a logical component connection or a path), and the second CTG may embody optical link 123 and the conjunction of optical links 121 and 125. The attributes of a composite connection (or CTG), i.e., the attributes of the component connections forming the CTG, may be stored to a memory (not shown) of, for example, optical nodes 107 and 109 and/or any other suitably accessible repository (not shown) of system 100. According to one embodiment, these attributes may be stored to one or more tables that provide network traffic visibility so as to enable optical nodes 107 and 109 the ability to maximize and efficiently allocate available bandwidth among various information transporting nodes, e.g., nodes 105 and 111, based on, for instance, mapping between characteristics of an traffic flow associated with label-switched domain 103 and the attributes of the component connections. According to particular embodiments, the attributes maybe determined based on the characteristics of the traffic flow. In essence, mapping between the characteristics of the traffic flow and the attributes associated with a CTG (e.g., CTG 203) enables traffic flows to be interworked onto the CTG.

Accordingly, once one or more composite connections are established, the composite connections may be announced to the network so that traffic flows associated with, for instance, label-switched domain 103, may be interworked onto the composite connection(s), per step 405. That is, a label-switched traffic flow, such as packetized optical signals, may be transported over one or more component connections (e.g., component connections 205a-205m), which are defined by one or more optical links (e.g., optical links 121, 123, and 125), based on determining one or more attributes associated with the component connections based on one or more characteristics of the traffic flow, and mapping the traffic flow to one or more of the component connections based on the one or more attributes.

Referring momentarily to FIG. 3, control module 305 establishes one or more CTGs (e.g., such as the two aforementioned CTGs of CTG domain 101) for transport of traffic flows from node 111 to client node 105, or vice versa, via optical nodes 107 and/or 109. As such, control interface 305 is further configured to interwork these traffic flows onto one or more CTGs but, more specifically, to interwork traffic flows on to one or more component connections that are bundled together to form the CTGs.

Figure 5:
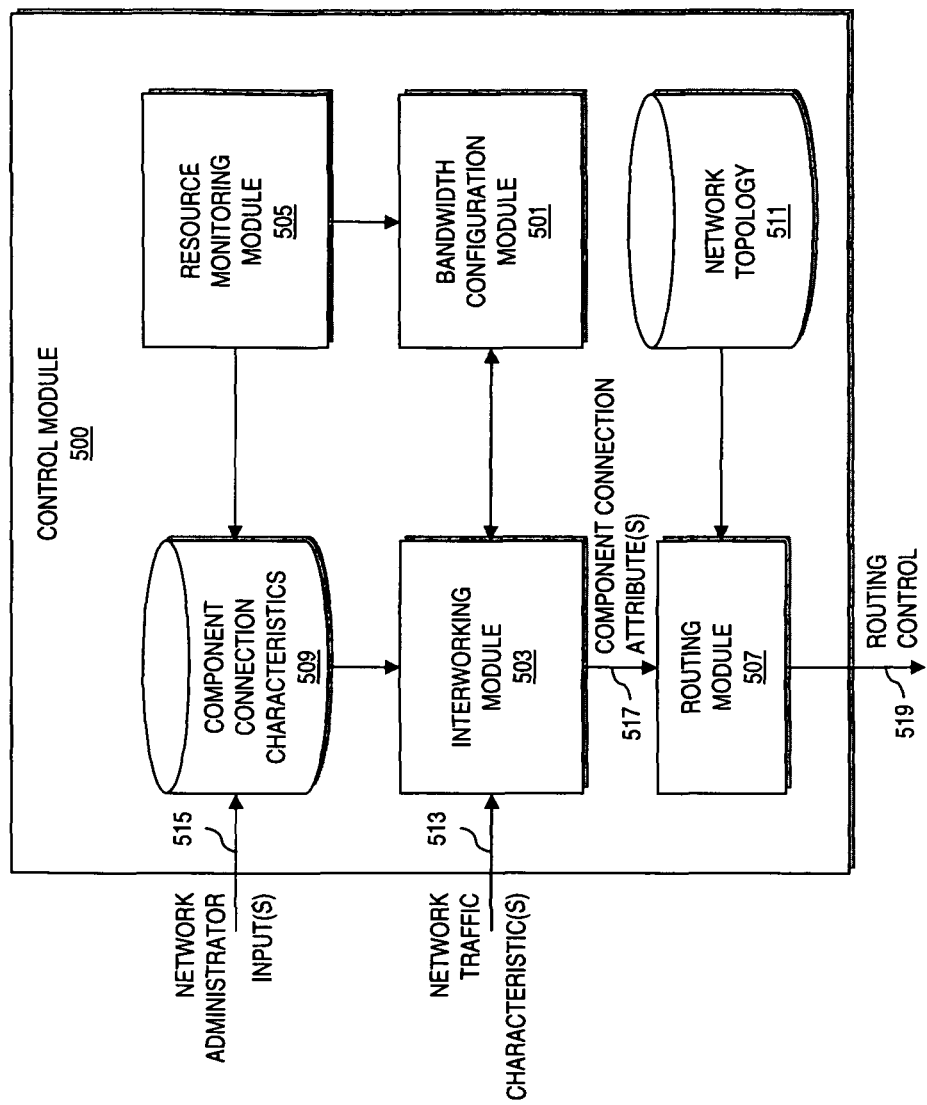
FIG. 5 is a diagram of a control module configured to map traffic onto composite transport groups, according to an exemplary embodiment.

FIG. 5 is a diagram of a control module configured to map traffic onto composite transport groups, according to an exemplary embodiment. As shown, control module 500 includes bandwidth configuration module 501, interworking module 503, resource monitoring module 505, and routing module 507, as well as component connection characteristics repository 509 and network topology repository 511. It is contemplated; however, that control module 500 may embody many forms. For example, control module 500 may comprise computing hardware (such as described with respect to FIG. 8), as well as include one or more components configured to execute the processes described herein for interworking traffic flows onto CTGs. It is contemplated that that the components of control model may be combined, located in separate structures, or separate physical locations.

In exemplary embodiments, interworking module 503 is configured to determine one or more attributes associated with a CTG based on one or more characteristics of a traffic flow associated with a label-switched domain, such as label-switched domain 103. In this manner, one or more "upstream" nodes, e.g., node 111, may provide these network traffic characteristic(s) 513 to interworking module 503 for provisioning the traffic flow onto the CTG. An "upstream" node may provide network traffic characteristics 513 in an LSP pathway request, an LDP flow request, an FRR tunnel request, or other like MPLS traffic flow establishment scheme. Interworking module 503 may also utilize one or more component connection characteristics acquired from, for example, component characteristics repository 509, to determine the attributes for mapping the traffic flow onto the CTG. According to other embodiments, component connection characteristics may be acquired from any other suitable memory or repository of control module 500, optical node 300, and/or system 100. As shown, component connection characteristics, such as physical bandwidth, available bandwidth, provisioned bandwidth, priority, etc., stored to component connection characteristics repository 509 may be acquired from one or more inputs 515 of a network administrator or acquired by monitoring network traffic provisioned onto one or more component connections. Resource monitoring module 505 can be utilized to monitor and store these component connection characteristics to component connection characteristics repository 509. In particular implementations, resource monitoring module 505 is particularly configured to monitor the consumption of bandwidth on component connections, such that physical bandwidth capabilities of component connections, as well as one or more component connection priorities may be supplied by a network administrator or other network management system (not illustrated) of system 100.

Accordingly, interworking module 503 includes logic for determining component connection attributes 517 based on characteristics of a traffic flow associated with label-switched domain 103. In particular embodiments, when a traffic flow is merely characterized by the information it transports, i.e., either no traffic flow bandwidth or priority is established, interworking module is also configured to assign a CTG (or component connection) bandwidth and/or priority to the traffic flow for mapping the traffic flow onto the CTG (or one or more of the component connections forming the CTG). Bandwidth configuration module 501 can be utilized for monitoring, via resource monitoring module 505, and determining bandwidth for at least a portion of the traffic flow that is to be provisioned onto a particular component connection. Accordingly, interworking module 503 may interface with bandwidth configuration module 501 to obtain bandwidth attributes. Based on these bandwidth attributes and/or other characteristics of the traffic flow, e.g., the type of traffic being transported, such as data, voice, video, etc., interworking module 503 may be further configured to determine priority attributes for the traffic flow. In certain embodiments, interworking module 503 may determine priority on a traffic flow basis, a per packet basis, or a per label basis.

Once sufficient component connection attributes 517 are determined by interworking module 503, the traffic flow may be mapped to one or more of the component connections forming a CTG. Routing module 507 may be configured for this purpose. Namely, routing module utilizes component connection attributes 517, as well as topological information characterizing CTG domain 101 stored to network topology repository 511, to provision traffic flows (or a portion thereof) from label-switched domain 103 onto one or more of the component connections forming a CTG. Network topology repository 511 may be populated utilizing one or more of the aforementioned signaling and/or routing protocols or may be pre-configured by a network administrator. In this manner, routing module 507 may be configured to generate routing control signals 519 for controlling optical switch section 307 of optical node 300. Thus, routing module 507 enables optical node 300 to provision network traffic flows onto a CTG transparently from the transportation entities sending and receiving the flow.

Accordingly, CTGs improve transport scalability by reducing the amount of information announced and, thereby, handled by singling and/or routing protocols, such as OSPF, IS-IS, etc., for the establishment of one or more traffic pathways. It is noted that this reduction is accomplished by performing information aggregation (or abstraction) based on and using information characteristic to particular CTGs, i.e., the attributes defining the characteristics of the component connections grouped into the particular CTGs. As such, CTGs are configured to resolve the provisioning of these traffic pathways onto one or more component connections forming the CTGs by interworking the traffic pathways onto the CTGs.

Figure 6:
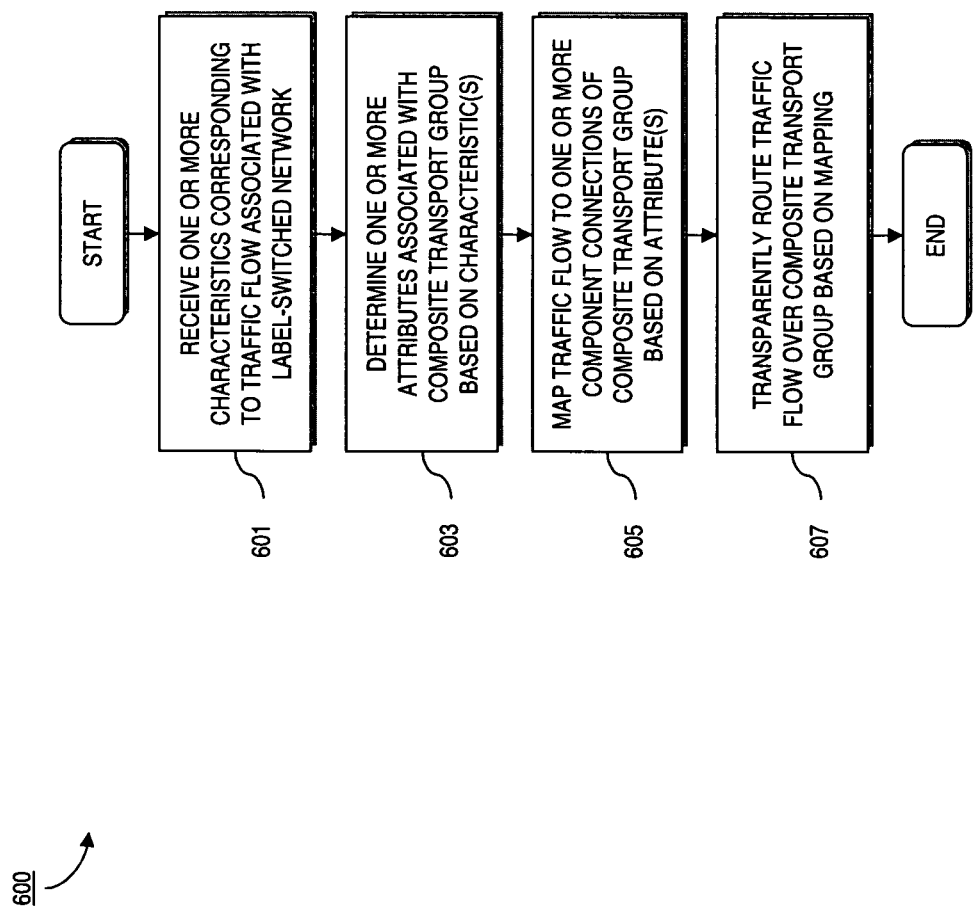
FIG. 6 is a flowchart of a process for mapping traffic onto composite transport groups, according to an exemplary embodiment.

FIG. 6 is a flowchart of a process for mapping traffic onto composite transport groups, according to an exemplary embodiment. For illustrative purposes, process 600 is described with reference to FIGS. 1, 3, and 5. It is noted that process 600 assumes that boundary node 111 is attempting to provision an traffic flow via a CTG of CTG domain 101. In this manner, boundary node 111 may be considered a source, client node 105 may be considered the target, and one or more of optical nodes 107 and 109 may be considered next hop nodes. As next hop nodes, however, optical nodes 107 and 109 may also be considered "upstream" nodes responsible for an LSP, an LDP flow, or FRR tunnel. Table 1 summarizes how the attributes are determined for each of these traffic flows.

TABLE 1

| LSP Traffic Flow Characteristic | | Corresponding Attribute Associated with Composite Transport Group LSP Mapped to Component Connections One-to-One or Multiple-to-One |
|---|---|---|
| Priority | Provided | Translated into one or more component connection priorities based on a predetermined class of service policy |
| | Not Provided | Not Applicable |
| Bandwidth | Provided | Translated into one or more component connection priorities based on a predetermined class of service policy |
| | Not Provided | Bandwidth automatically configured (as described with respect to FIG. 7) |
| LDP Traffic Flow Characteristic | | Corresponding Attribute Associated with Composite Transport Group |
| | | LDP Traffic Mapped to Single Connection / LDP Traffic Mapped to Multiple Connections Configured Per LDP Label |
| Priority | Provided | LDP traffic priorities translated on a per packet basis into one or more component connection priorities based on a predetermined class of service policy / LDP traffic priorities translated on a per packet basis into one or more component connection priorities based on a predetermined class of service policy |
| | Not Provided | Not Applicable / Not Applicable |
| Bandwidth | Provided | Not Applicable / Not Applicable |
| | Not Provided | Bandwidth automatically configured / Bandwidth automatically configured |
| FRR Tunnel Characteristic | | Corresponding Attribute Associated with Composite Transport Group FRR Tunnel Mapped to Component Connections One-to-One or Multiple-to-One |
| Priority | Provided | Not Applicable |
| | Not Provided | Automatically configured based on a predetermined class of service policy |
| Bandwidth | Provided | Not Applicable |
| | Not Provided | Bandwidth automatically configured | interworking the traffic flow onto one or more CTGs established between optical nodes 107 and 109 and client node 105. Accordingly, boundary node 111 may also be considered a "downstream" node. It is noted that steps of process 600 may be performed in any suitable order or combined in any suitable manner.

In step 601, interworking module 503 of, for example, an "upstream node" (e.g., optical node 107) receives one or more characteristics 513 corresponding to a traffic flow associated with label-switched domain 103 from a "downstream" node (e.g., boundary node 111) attempting to route the traffic flow over a CTG to client node 105. According to various embodiments, the traffic flow may correspond to an MPLS traffic flow but, more specifically, may correspond to an MPLS traffic flow, such as an LSP, an LDP flow, or a FRR tunnel. In the case of an LSP, the characteristics will correspond to a traffic flow priority, which may or may not be accompanied by a traffic flow bandwidth. For LDP flows, the characteristic includes a traffic flow priority. For FRR tunnels, no priority or bandwidth is provided.

Based on the received characteristics, interworking module 503 determines, per step 603, one or more attributes associated with a CTG, i.e., one or more component connection attributes 517, such as one or more component connection priorities and one or more component connection bandwidths. According to one embodiment, these attributes are further determined based on the type of traffic flow attempting to be provisioned onto the CTG. That is, the one or more attributes are determined based on whether the traffic flow is Once the attributes are determined, interworking module 503 may port the attributes to routing module 507 so that the traffic flow can be mapped onto one or more component connections forming the CTG, per step 605. Accordingly, during step 607, routing module 507 transparently routes the traffic flow over the CTG based on the mapping. That is, routing module 507 controls switch section 307 of, for example, optical node 107, in order to provision the traffic flow over one or more component connections of the CTG.

Figure 7:
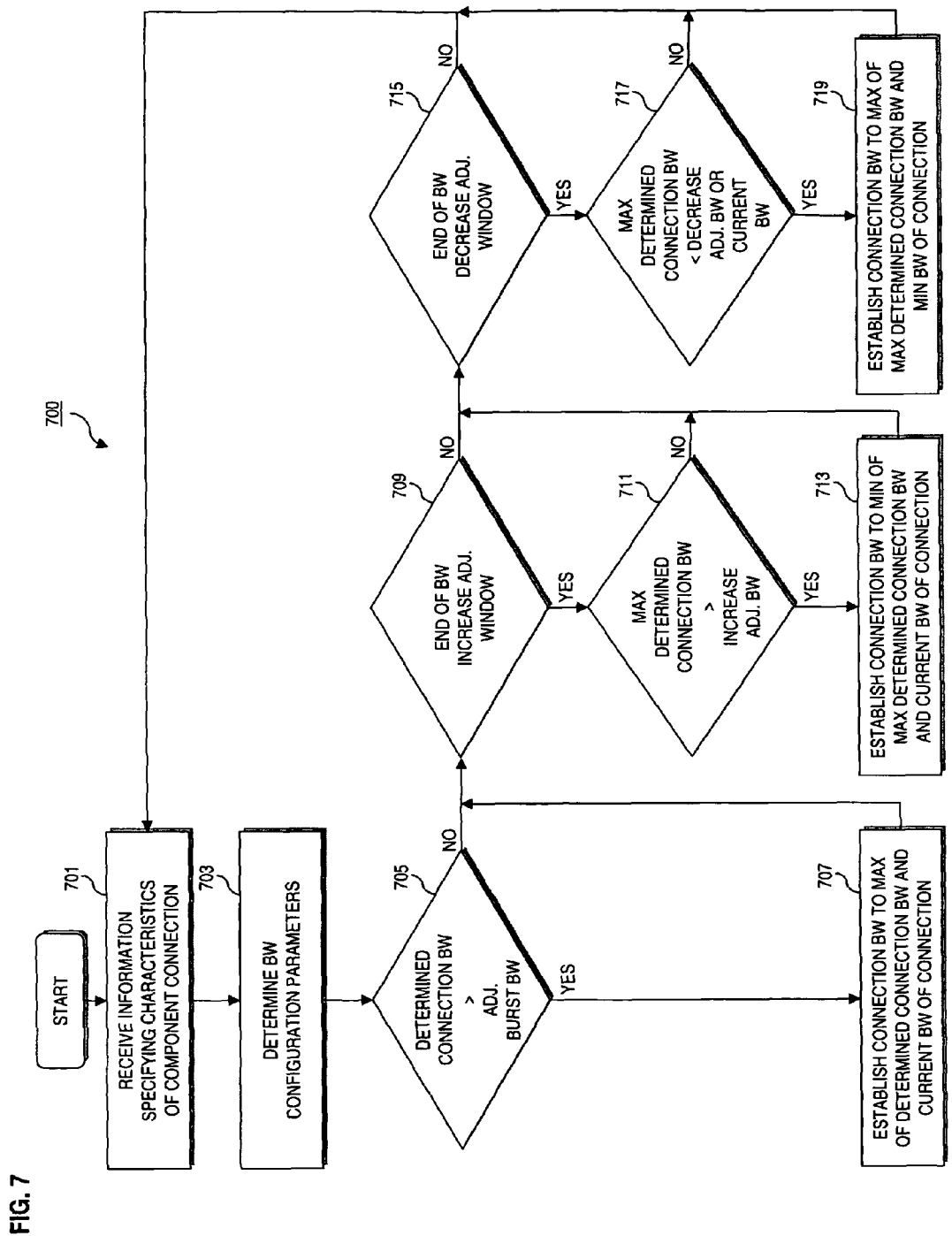
FIG. 7 is a flowchart of a process for automatic bandwidth configuration to support mapping of traffic onto composite transport groups, according to an exemplary embodiment.

FIG. 7 is a flowchart of a process for automatic bandwidth configuration to support mapping of traffic onto composite transport groups, according to an exemplary embodiment. For illustrative purposes, process 700 is described with reference to FIGS. 1 and 5. It is assumed that interworking module 503 is not provided with a traffic flow bandwidth characteristic and, therefore, may utilize resource monitoring module 505 and bandwidth configuration module 501 to dynamically monitor and assign a bandwidth to the one or more component connections hosting at least a portion of a traffic flow associated with label-switched domain 103. The bandwidth may be configured according to any specified granularity, i.e., for the aggregate traffic flow (such as for LSPs or FRR tunnels), on a per packet basis (such as for an LDP traffic flow provisioned on a single component connection), or on a per label basis (such as for a large LDP traffic flow provisioned to multiple component connections). Accordingly, bandwidth configuration module 501 assigns component connection bandwidths to each of these granularities in a similar manner, i.e., utilizing process 700. For the sake of simplicity, process 700 is described with respect to automatic bandwidth configuration for a single component connection. However, the process 700 is applicable to automatic bandwidth configuration for multiple component con-103. Table 2 summarizes the bandwidth configuration parameters. By way of example, bandwidth configuration parameters of Table 2 are determined in bits per second (bps) for each Time Interval, which is also described in Table 2.

TABLE 2

| | |
|---|---|
| Adjustment Burst Bandwidth (BW) = | Current Component Connection BW + BW Burst Threshold OR Current Component Connection BW * (1 + BW Burst Threshold %) |
| Determined (or Calculated) Component Connection BW = | Accumulated BW at Component Connection Ingress/Time Interval |
| Decrease Adjustment BW = | Previous Component Connection BW − BW Adjustment Threshold OR Determined Component Connection BW * (1 − BW Adjustment Threshold %) |
| Increase Adjustment BW = | Current Component Connection BW + BW Adjustment Threshold OR Current Component Connection BW * (1 + BW Adjustment Threshold %) |
| Maximum Determined Component Connection BW = | Maximum of Determined Component Connection BW during a Bandwidth Increase Adjustment Window (BIAW) or a Bandwidth Decrease Adjustment Window (BDAW) |
| where | |
| BW Adjustment Threshold = | Predetermined minimum amount of BW (or BW %) change within the current component connection BW required in order for the BW of the component connection to be adjusted. For example: If Current Component Connection BW = 100 Mbps, and BW Adjustment Threshold = 10 Mbps (or 10%), then a Configured Component Connection BW will remain unchanged unless a Maximum Determined Component Connection BW for that component connection is less than 90 Mbps or greater than 110 Mbps |
| BW Burst Threshold = | Predetermined minimum amount of BW (or BW %) increase within the determined component connection BW required in order for the component connection BW to be increased at the end of a time interval |
| BDAW = | Predetermined number of time intervals required before component connection bandwidth may be decreased For example: If BDAW = 0, then component connection BW may be adjusted at the end of every time interval If BDAW = 1, then component connection BW may be adjusted at the end of every other time interval |
| BIAW = | Predetermined number of time intervals required before component connection bandwidth may be increased For example: If BIAW = 0, then component connection BW may be adjusted at the end of every time interval If BIAW = 1, then component connection BW may be adjusted at the end of every other time interval |
| Time Interval = | Predetermined amount of time over which the amount of BW at component connection ingress is determined | nections. Further, the steps of process 700 may be performed in any suitable order or combined in any suitable manner.

At step 701, bandwidth configuration module 701 receives information specifying characteristics of a component connection, such as a minimum bandwidth setting of network traffic provisioned to the component connection, a maximum bandwidth setting of traffic provisioned to the component connection, and an accumulated network traffic bandwidth at an ingress point of the component connection over a predetermined time interval(s). Utilizing this information, bandwidth configuration module 501 can determine, per step 703, various bandwidth configuration parameters associated with the component connection of a CTG of CTG domain 101. These bandwidth configuration parameters are used to determine a bandwidth configuration for the component connection for hosting at least a portion of an engineered network flow associated with, for example, label-switched domain After bandwidth configuration parameters are determined, bandwidth configuration module 501 implements the methodology of steps 705 through 719 of process 700 to establish a bandwidth for the component connection. It is noted that process 700 is a cyclic process performed for each time interval. Thus, according to exemplary embodiments, bandwidth configuration module 501 can be configured to provide a component connection bandwidth configuration on a periodic basis to interworking module 503. Further, these component connection bandwidth configurations may be provided as needed, which will become more apparent as steps 705 through 719 are described below. It is noted that this enables traffic flows to be more efficiently mapped onto the component connections forming a CTG.

At step 705, bandwidth configuration module 501 determines whether a Determined (or Calculated) Connection Bandwidth for a particular time interval is greater than an Adjustment Burst Bandwidth for that time interval. If so, then, in step 707, bandwidth configuration module 501 provides interworking module 503 with a component connection bandwidth established as a maximum between the Determined Connection Bandwidth and the current bandwidth provisioned to the component connection. The process then proceeds onto step 709. For example, Table 3 illustrates one scenario whereby bandwidth is assigned based on a bandwidth burst threshold:

TABLE 3

| Parameter | Value |
| --- | --- |
| Minimum bandwidth setting of traffic provisioned to the component connection | 150 Mbps |
| Maximum bandwidth setting of traffic provisioned to the component connection | 1000 Mbps |
| Current bandwidth provisioned to the component connection | 200 Mbps |
| Bandwidth Burst Threshold | 50% |
| Bandwidth Adjustment Threshold | 10% |
| BIAW | 5 |
| Determined Component | 350 Mbps |
| Adjustment Burst Bandwidth | 300 Mbps, i.e., 200 Mbps * (1 + 50%) |

Under the above example, based on step 707, the bandwidth will be established as 350 Mbps since the Determined Component Connection Bandwidth, i.e., 350 Mbps, is greater than the Adjustment Burst Bandwidth, i.e., 200 Mbps, and the Determined Component Connection Bandwidth, i.e., 350 Mbps, is greater than the current bandwidth provisioned to the component connection, i.e., 200 Mbps.

If, however, at step 705 the Determined Connection Bandwidth for the particular time interval is less than or equal to the Adjustment Burst Bandwidth for the time interval, then at the process 700, per step 709, determines whether the end of the current time interval corresponds to the end of a BIAW. If the current time interval does correspond to the end of a BIAW, then at step 711, bandwidth configuration module 501 determines whether a Maximum Determined Component Connection Bandwidth is greater than an Increase Adjustment Bandwidth. If so, then at step 713, bandwidth configuration module 501 provides interworking module 503 with a component connection bandwidth established as a maximum between the Maximum Determined Component Connection Bandwidth and the current bandwidth provisioned to the component connection. The process then can proceed onto step 715, wherein the process 700 checks for expiration of the decrease adjustment window.

To further illustrate this process 700, another example is presented in Table 4:

TABLE 4

| Parameter | Value |
| --- | --- |
| Minimum bandwidth setting of traffic provisioned to the component connection | 150 Mbps |
| Maximum bandwidth setting of traffic provisioned to the component connection | 1000 Mbps |
| Current bandwidth provisioned to the component connection | 200 Mbps |
| Bandwidth Burst Threshold | 50% |
| Bandwidth Adjustment Threshold | 10% |
| BIAW | 5 |
| Determined Component | 350 Mbps |

TABLE 4-continued

| Parameter | Value |
| --- | --- |
| Adjustment Burst Bandwidth | 300 Mbps, i.e., 200 Mbps * (1 + 50%) |
| Maximum Determined (e.g., Calculated) Connection Bandwidth | 250 Mbps |

For this example, based on step 707, the bandwidth will not be immediately adjusted since the Maximum Determined Component Connection Bandwidth, i.e., 250 Mbps, is less than the Adjustment Burst Bandwidth, i.e., 350 Mbps. However, based on steps 709-713, the bandwidth will be established as 250 Mbps since the Maximum Determined Component Connection Bandwidth, i.e., 250 Mbps, is greater than the Increase Adjustment Bandwidth of 220 Mbps (i.e., 200*(1+10%)), and the Maximum Determined Component Connection Bandwidth, i.e., 250 Mbps, is greater than the current bandwidth provisioned to the component connection, i.e., 200 Mbps.

If, however, at step 709, the time interval does not correspond to the end of BIAW or, at step 711, the Maximum Determined Component Connection Bandwidth is less than or equal to the Increase Adjustment Bandwidth, then the process 700, in step 715, determines whether the end of the current time interval corresponds to the end of a BDAW. If the current time interval does correspond to the end of a BDAW, then at step 717, bandwidth configuration module 501 determines whether a Maximum Determined Component Connection Bandwidth is less than a Decrease Adjustment Bandwidth or a current bandwidth provisioned to the component connection. If so, then at step 719, bandwidth configuration module 501 provides interworking module 503 with a component connection bandwidth established as a maximum between the Maximum Determined Component Connection Bandwidth and the minimum bandwidth setting of traffic provisioned to the component connection. The process 700 then reiterates for the next time interval, i.e., the process reverts to step 701.

Table 5 provides an example in which the bandwidth is decreased:

TABLE 5

| Parameter | Value |
| --- | --- |
| Minimum bandwidth setting of traffic provisioned to the component connection | 150 Mbps |
| Maximum bandwidth setting of traffic provisioned to the component connection | 1000 Mbps |
| Current bandwidth provisioned to the component connection | 200 Mbps |
| Bandwidth Burst Threshold | 50% |
| Bandwidth Adjustment Threshold | 10% |
| BIAW | 5 |
| Determined Component | 350 Mbps |
| Adjustment Burst Bandwidth | 300 Mbps, i.e., 200 Mbps * (1 + 50%) |
| Maximum Determined (e.g., Calculated) Connection Bandwidth | 120 Mbps |

The above parameters are essentially identical to those in the example of Table 4, with the exception that the Maximum Determined Component Connection Bandwidth is 120 Mbps. Based on step 707, the bandwidth will not be immediately adjusted since the Maximum Determined Component Connection Bandwidth is 120 Mbps, which is less than the Adjustment Burst Bandwidth, i.e., 300 Mbps. Further, based on step 711, the bandwidth will not be increased at the end of BIAW, since the Maximum Determined Component Connection Bandwidth, i.e., 120 Mbps, is less than the Increase Adjustment Bandwidth, i.e., 220 Mbps (i.e., 200*(1+10%)). However, based on steps 715-719, the bandwidth will be established as 150 Mbps since the Maximum Determined Component Connection Bandwidth, i.e., 120 Mbps, is less than the Decrease Adjustment Bandwidth of 315 Mbps (i.e., 350*(1–10%)), and the Maximum Determined Component Connection Bandwidth, i.e., 120 Mbps, is greater than minimum bandwidth setting of traffic provisioned to the component connection, i.e., 150 Mbps. If, however, minimum bandwidth setting of traffic provisioned to the component connection is less than 120 Mbps, then the bandwidth will be established as 120 Mbps at the end of BIAW.

Accordingly, the methodology of automatic bandwidth configuration provided by bandwidth configuration module 501 enables interworking module 503 and/or routing module 507 to adjust component connection bandwidths more dynamically and more frequently, i.e., at different time intervals. Such technique enables interworking module 503 and/or or routing module 507 to effectively correlate component connection attributes to, for instance, the burstiness of the traffic flow being interworked onto the component connections of the CTG. In turn, control module 500 may more effectively utilize the connection pre-emption functions of MPLS-TE, as well as facilitate the reduction in component connection flapping and network traffic congestion. In essence, the methodology enables component connection bandwidth to be raised rapidly to respond to traffic burstiness and ensure enough bandwidth is allocated to prevent traffic congestion; however, enable component connection bandwidth to be lowered to free up unnecessarily allocated bandwidth to more efficiently utilize network resources.

The processes described herein for interworking traffic onto composite transport groups may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
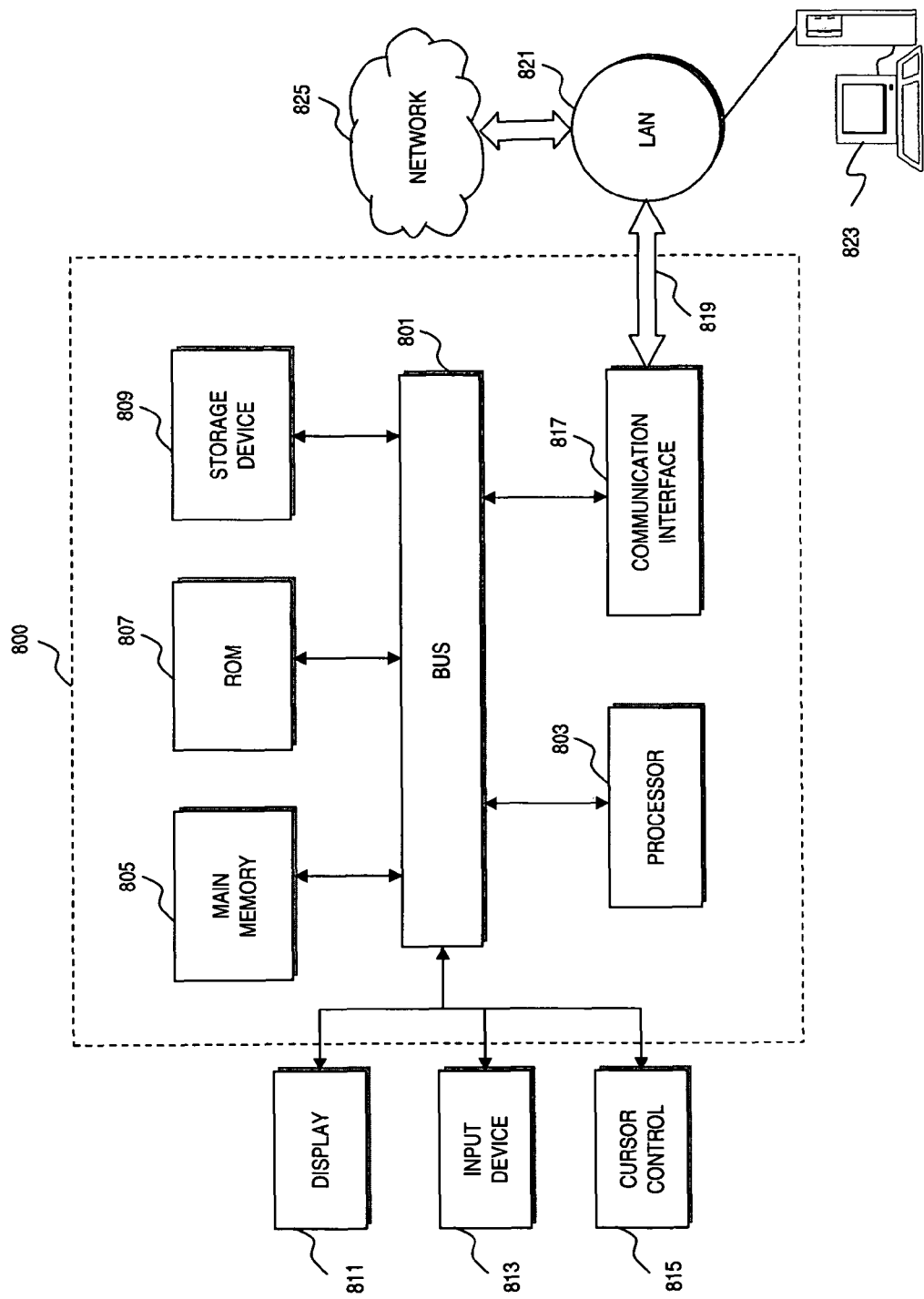
FIG. 8 is a diagram of a computer system that can be used to implement various exemplary embodiments.

FIG. 8 illustrates computing hardware (e.g., computer system) 800 upon which an embodiment according to the invention can be implemented. The computer system 800 includes a bus 801 or other communication mechanism for communicating information and a processor 803 coupled to the bus 801 for processing information. The computer system 800 also includes main memory 805, such as a random access memory (RAM) or other dynamic storage device, coupled to the bus 801 for storing information and instructions to be executed by the processor 803. Main memory 805 can also be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining an attribute associated with a composite transport group of a composite transport group domain, based on a characteristic of a traffic flow associated with a label-switched domain;
   mapping the traffic flow to one or more component connections of the composite transport group based on the attribute;
   assigning a bandwidth to the one or more component connections according to an automatic bandwidth configuration scheme, wherein the automatic bandwidth configuration scheme defines a first adjustment window for increasing the bandwidth and defines a second adjustment window for decreasing the bandwidth, each of the adjustment windows specifying one or more measurement intervals;
   determining, during the first adjustment window, to increase the bandwidth if a current bandwidth is greater than a sum of the bandwidth and a bandwidth burst threshold; and
   determining, after the first adjustment window, to increase the bandwidth if a maximum determined bandwidth is greater than a sum of the bandwidth and a bandwidth adjustment threshold,
   wherein the one or more component connections host at least a portion of the traffic flow associated with the label-switched domain.

2. A method according to claim 1, wherein the traffic flow corresponds to one of a resource reservation protocol signaled label switched path, a label distribution protocol flow, or a fast re-route tunnel.

3. A method according to claim 1, wherein the characteristic corresponds to traffic flow priority or bandwidth, and the attribute corresponds to component connection priority or component connection bandwidth.

4. A method according to claim 1, wherein the composite transport group domain includes one or more nodes and the label-switched domain includes one or more or other nodes, and wherein the one or more nodes and the one or more other nodes each reside in an autonomous system.

5. A method according to claim 1, further comprising:
   routing the traffic flow over the composite transport group based on the mapping.

6. A method according to claim 5, wherein routing the traffic flow includes routing the traffic flow transparently.

7. A method according to claim 5, further comprising:
   determining, after the second adjustment window, to decrease the bandwidth if a maximum determined bandwidth is less than a resultant of a previous bandwidth less a bandwidth adjustment threshold.

8. An apparatus comprising:
   at least one memory;
   at least one processor,
   the at least one processor configured to:
      determine an attribute associated with a composite transport group of a composite transport group domain, based on a characteristic of a traffic flow associated with a label-switched domain,
      map the traffic flow to one or more component connections of the composite transport group based on the attribute,
      assign a bandwidth to the one or more component connections according to an automatic bandwidth configuration scheme, wherein the automatic bandwidth configuration scheme defines a first adjustment window for increasing the bandwidth and defines a second adjustment window for decreasing the bandwidth, each of the adjustment windows specifying one or more measurement intervals,
      determine, during the first adjustment window, to increase the bandwidth if a current bandwidth is greater than a sum of the bandwidth and a bandwidth burst threshold, and
      determine, after the first adjustment window, to increase the bandwidth if a maximum determined bandwidth is greater than a sum of the bandwidth and a bandwidth adjustment threshold, wherein the one or more component connections host at least a portion of the traffic flow associated with the label-switched domain.

9. An apparatus according to claim 8, wherein the traffic flow corresponds to one of a resource reservation protocol signaled label switched path, a label distribution protocol flow, or a fast re-route tunnel.

10. An apparatus according to claim 8, wherein the characteristic corresponds to traffic flow priority or bandwidth, and the attribute corresponds to component connection priority or component connection bandwidth.

11. An apparatus according to claim 8, wherein the composite transport group domain includes one or more nodes and the label-switched domain includes one or more or other nodes, and wherein the one or more nodes and the one or more other nodes each reside in an autonomous system.

12. An apparatus according to claim 8, wherein the at least one processor is further configured to route the traffic flow over the composite transport group based on the mapping.

13. An apparatus according to claim 12, wherein routing the traffic flow includes routing the traffic flow transparently.

14. An apparatus according to claim 12, wherein the at least one processor is further configured to determine, after the second time interval lapses, to decrease the bandwidth if a maximum determined bandwidth is less than a resultant of a previous bandwidth less a bandwidth adjustment threshold.

15. A method comprising:
maintaining a first adjustment window for increasing bandwidth of a logical point-to-point connection of a composite transport group domain, the point-to-point connection hosts at least a portion of a traffic flow associated with a label-switched domain;
maintaining a second adjustment window for decreasing bandwidth of the logical point-to-point connection;
computing a connection bandwidth of the logical point-to-point connection during the first adjustment window according to an automatic bandwidth configuration scheme, wherein the automatic bandwidth scheme defines the adjustment windows and each of the adjustment windows specify one or more measurement intervals;
determining an adjustment burst bandwidth related to the logical point-to-point connection by summing the computed connection bandwidth and a bandwidth burst threshold;
setting the bandwidth of the logical point-to-point connection based on the computed connection bandwidth or a predetermined maximum bandwidth, if the computed connection bandwidth is greater than a sum of a current connection bandwidth and the bandwidth burst threshold;
determining a maximum connection bandwidth for the first adjustment window; and
after expiration of the first adjustment window, setting the bandwidth of the logical point-to-point connection based on the determined maximum connection bandwidth or a predetermined maximum bandwidth, if the determined maximum connection bandwidth is greater than a sum of a current computed connection bandwidth and a bandwidth adjustment threshold.

16. A method according to claim 15, wherein the bandwidth is configurable to one or more granularities, the one or more granularities including one or more of an aggregate traffic flow, a per packet basis, and a per label basis.

17. A method according to claim 15, further comprising:
determining a maximum connection bandwidth for the second adjustment window; and
after expiration of the second adjustment window, setting the bandwidth of the logical point-to-point connection based on the determined maximum connection bandwidth or a predetermined maximum bandwidth, if the determined maximum connection bandwidth is less than a resultant of a previous computed connection bandwidth less the bandwidth adjustment threshold.

18. An apparatus comprising:
at least one memory;
at least one processor,
the at least one processor configured to:
maintain a first adjustment window for increasing bandwidth of a logical point-to-point connection of a composite transport group domain, the point-to-point connection hosts at least a portion of a traffic flow associated with a label-switched domain;
maintain a second adjustment window for decreasing bandwidth of the logical point-to-point connection;
compute a connection bandwidth of the logical point-to-point connection during the first adjustment window according to an automatic bandwidth configuration scheme, wherein the automatic bandwidth scheme defines the adjustment windows and each of the adjustment windows specify one or more measurement intervals;
determine an adjustment burst bandwidth related to the logical point-to-point connection by summing the computed connection bandwidth and a bandwidth burst threshold;
set the bandwidth of the logical point-to-point connection based on the computed connection bandwidth or a predetermined maximum bandwidth, if the computed connection bandwidth is greater than a sum of a current connection bandwidth and the bandwidth burst threshold;
determining a maximum connection bandwidth for the first adjustment window; and
after expiration of the first adjustment window, setting the bandwidth of the logical point-to-point connection based on the determined maximum connection bandwidth or a predetermined maximum bandwidth, if the determined maximum connection bandwidth is greater than a sum of a current computed connection bandwidth and a bandwidth adjustment threshold.

19. An apparatus according to claim 18, wherein the bandwidth is configurable to one or more granularities, the one or more granularities including one or more of an aggregate traffic flow, a per packet basis, and a per label basis.

20. An apparatus according to claim 18, wherein the at least one processor is further configured to:
determine a maximum connection bandwidth for the second adjustment window; and
after expiration of the second adjustment window, set the bandwidth of the logical point-to-point connection based on the determined maximum connection bandwidth or a predetermined maximum bandwidth, if the determined maximum connection bandwidth is less than a resultant of a previous computed connection bandwidth less the bandwidth adjustment threshold.

* * * * *